(12) United States Patent
Redfern

(10) Patent No.: US 7,391,820 B2
(45) Date of Patent: Jun. 24, 2008

(54) MULTITONE POWER SPECTRAL DENSITY

(75) Inventor: Arthur J. Redfern, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 886 days.

(21) Appl. No.: 10/613,145

(22) Filed: Jul. 3, 2003

(65) Prior Publication Data

US 2004/0037216 A1   Feb. 26, 2004

Related U.S. Application Data

(60) Provisional application No. 60/394,358, filed on Jul. 8, 2002.

(51) Int. Cl.
*H04L 27/04*   (2006.01)
(52) U.S. Cl. .................................. 375/295
(58) Field of Classification Search ............... 375/222, 375/227, 260, 295, 346, 316, 350, 225; 370/201, 370/203, 235, 278, 282, 480, 286; 455/507, 455/517, 522, 130; 379/22.08, 395.01, 416, 379/93.05; 348/607, 659; 708/313
See application file for complete search history.

(56) References Cited

U.S. PATENT DOCUMENTS

| | | | |
|---|---|---|---|
| 5,384,547 A | | 1/1995 | Lynk, Jr. et al. |
| 5,825,826 A | * | 10/1998 | May et al. .................... 375/295 |
| 6,563,864 B1 | * | 5/2003 | Ibrahim et al. ............... 375/222 |
| 6,650,697 B1 | * | 11/2003 | Tate et al. .................... 375/222 |
| 6,718,019 B1 | * | 4/2004 | Heidari et al. ............ 379/93.05 |
| 6,765,989 B1 | * | 7/2004 | Murphy et al. ........... 379/22.08 |
| 6,922,448 B1 | | 7/2005 | Jacobsen et al. |
| 7,023,929 B2 | | 4/2006 | Mujica et al. |
| 7,113,491 B2 | * | 9/2006 | Graziano et al. ............ 370/286 |
| 2002/0072386 A1 | * | 6/2002 | Ginesi et al. ................ 455/522 |
| 2002/0163974 A1 | * | 11/2002 | Friedman .................... 375/295 |
| 2003/0081759 A1 | * | 5/2003 | Harris ................... 379/395.01 |
| 2003/0086486 A1 | * | 5/2003 | Graziano et al. ............ 375/222 |
| 2003/0086514 A1 | * | 5/2003 | Ginis et al. ................. 375/346 |
| 2003/0099286 A1 | * | 5/2003 | Grazaiano et al. .......... 375/222 |
| 2003/0101206 A1 | * | 5/2003 | Graziano et al. ............ 708/277 |
| 2003/0152141 A1 | * | 8/2003 | Cherubini ................... 375/225 |

FOREIGN PATENT DOCUMENTS

EP   1043857 A1   11/2000

OTHER PUBLICATIONS

Schelstraete, S., Upstream Power Back-off in VDSL, Nov. 25-29, 2001, Global Telecommunciations Conference, 2001, GLOBECOM '01, IEEE, vol. 1, pp. 399-404.*

Jacobsen, Krista S.; Methods of Upstream Power Backoff on Very High-Speed Digital Subscriber Lines; pp. 210-216; IEEE Communications Magazine, Mar. 2001.

Jacobsen, Krista S; Text Proposal for Upstream Power Back-Off; pp.1-6.

* cited by examiner

*Primary Examiner*—Mohammad H. Ghayour
*Assistant Examiner*—Lawrence B Williams
(74) *Attorney, Agent, or Firm*—Steven A. Shaw; W. James Brady; Frederick J. Telecky, Jr.

(57) ABSTRACT

A method of transmit power adjustment in multitone communication systems is performed by changing a power spectral density for each subchannel k the power spectral density to the minimum of the power spectral density and a miximum of the power spectral density REFPSD(k)=min(NOMPSD (k), NOMPSD−PCB) where REFPSD(k) is the transmitted PSD at tone k, NOMPSD(k) is the maximum transmit PSD allowed at each tone k, NOMPSD is the maximum value of NOMPSD(k) over all k and PCB is a power cutback level.

5 Claims, 2 Drawing Sheets

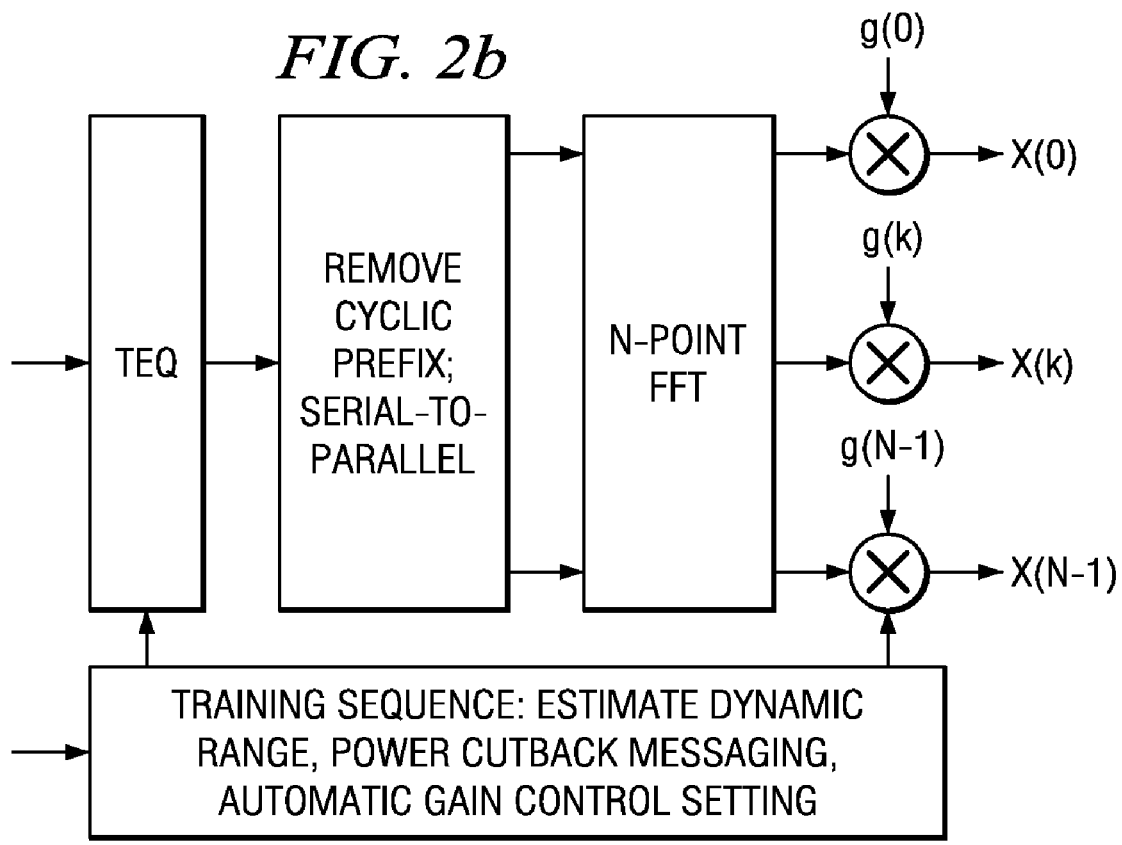

MULTITONE POWER SPECTRAL DENSITY

CROSS-REFERENCE TO RELATED APPLICATIONS

Priority is claimed from U.S. Provisional Application No. 60/394,358, filed Jul. 8, 2002. The following patent applications disclose related subject matter: U.S. Ser. No. 09/715,811, filed Nov. 17, 2000, now U.S. Pat. No. 6,922,448 issued on Jul. 26, 2005 and U.S. Ser. No. 10/191,994, filed Jul. 10, 2002, now U.S. Pat. No. 7,023,929 issued on Apr. 4, 2006. These applications have a common assignee with the present application.

BACKGROUND OF THE INVENTION

The invention relates to digital communications, and, more particularly, to discrete multitone communication systems and corresponding circuitry and methods.

Digital subscriber line (DSL) technologies provide potentially large bandwidth (e.g., greater than 20 MHz for subscribers close to the central office) for digital communication over existing telephone subscriber lines (the copper plant). The subscriber lines can provide this bandwidth despite their original design for voice band (0-4 kHz) analog communication. In particular, ADSL (asymmetric DSL) adapts to the characteristics of the subscriber line by using a discrete multitone (DMT) line code with the number of bits per tone (subchannel) adjusted to channel conditions. The bits of a codeword are allocated among the subchannels for modulation to form an ADSL symbol for transmission. FIG. 2a illustrates the use of the Fast Fourier transform in a system having, for example, 256 tones with each tone treated as a QAM subchannel (except dc tone 0) and so the kth tone encoding corresponds with a complex number $X(k)$ for $0 \leq k \leq 255$. Extending to 512 tones by conjugate symmetry allows the 512-point IFFT to yield real samples $x(n)$, $0 \leq n \leq 511$, of the transformed block (symbol); and a DAC converts these samples into a segment of the transmitted waveform $x(t)$. FIG. 2a also notes a cyclic prefix for each symbol which allows for simplified equalization for the interference of successive symbols which arises from the non-ideal impulse response of the transmission channel.

For example, Annex A of the ADSL standard G.992.3 has subchannels separated by 4.3125 KHz and a band extending up to 1104 KHz for 256 subchannels. Annex A also provides power spectral density (PSD) masks for both central office and customer transmitters plus 0-40 dB power cutback levels to be applied according to dynamic range measured by the central office and customer receivers during initialization procedures. In higher bandwidth versions of the ADSL standard, the PSD can be shaped for efficient operation, such as limiting crosstalk among physically adjacent subscriber lines and reducing the transmit power requirements. However, power cutbacks for transmitters with shaped power spectral densities (PSDs) can render the low power portions of the spectrum useless.

SUMMARY OF THE INVENTION

The present invention provides a ceiling-based power cutback method for discrete multitone systems.

This has advantages including the improved utilization of the frequency spectrum with power cutback.

BRIEF DESCRIPTION OF THE DRAWINGS

FIGS. 2a-2b show functional blocks of a discrete multitone system.

DETAILED DESCRIPTION OF THE PREFERED EMBODIMENTS

1. Overview

Figure 1:
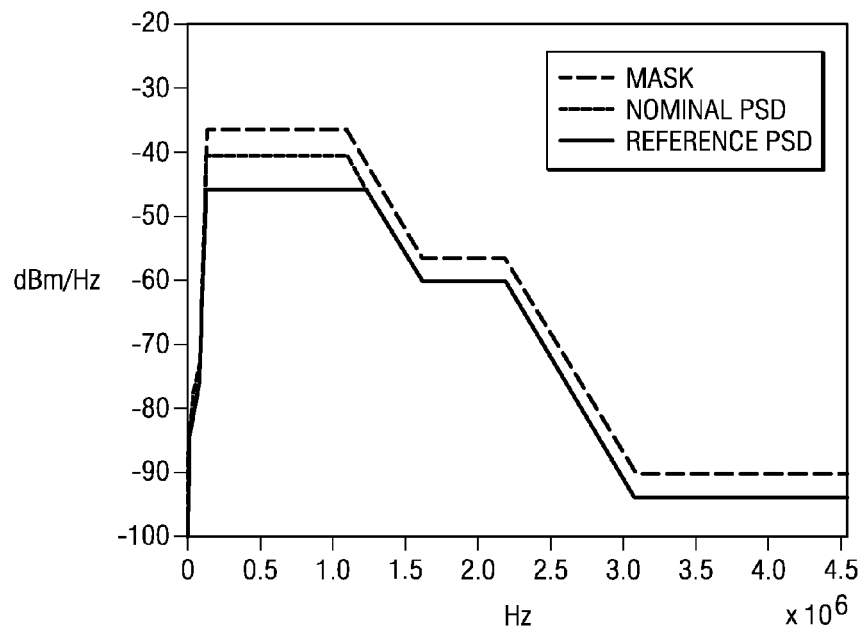
FIG. 1 shows preferred embodiment power cutback.

Preferred embodiments provide power cutback methods useful for multitone systems employing transmit power optimization and with shaped power spectral density (PSD) masks. As illustrated in FIG. 1, the methods apply a power ceiling (saturation) instead of a uniform power decrease across an entire PSD mask passband. This effectively boosts the relative power of the low power portions of a shaped PSD while still achieving essentially the same total power reduction as a uniform power cutback.

Figure 2A:
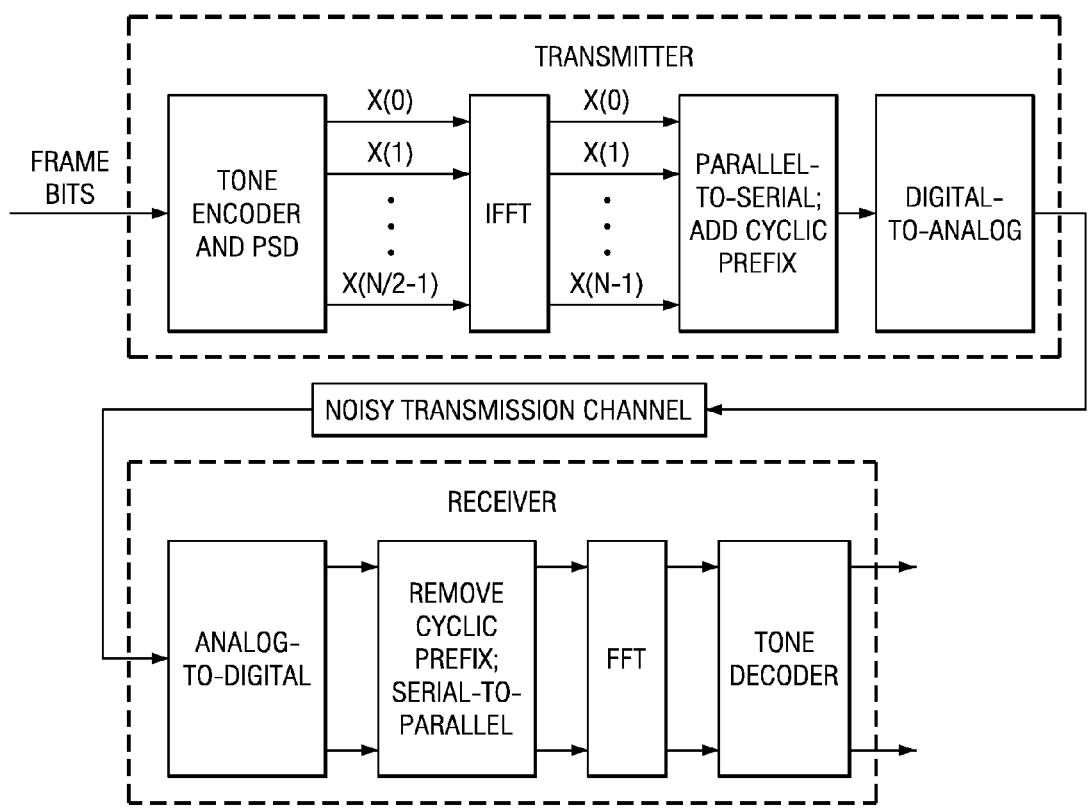

FIGS. 2a-2b illustrate functional blocks of a discrete multitone system which may use the preferred embodiment methods with PSD and framing part of the encoding prior to IFFT in the transmitter, whereas dynamic range measurements of the received signal occur in the receiver.

Preferred embodiment communications systems use preferred embodiment methods. In preferred embodiment communications systems customer premises transceivers (modems) and central office transceivers (modems) could each include one or more digital signal processors (DSPs) and/or other programmable devices with stored programs for performance of the signal processing of the preferred embodiment methods. Alternatively, specialized circuitry could be used. The transceivers may also contain analog integrated circuits for amplification of inputs and/or outputs and conversion between analog and digital; and these analog and processor circuits may be integrated as a system on a chip (SoC). The stored programs may, for example, be in ROM or flash EEPROM integrated with the processor or external. Exemplary DSP cores could be in the TMS320C6xxx or TMS320C5xxx families from Texas Instruments.

2. Power Cutback

Power cutback preferred embodiment methods are ceiling-based and allow for good performance in the high frequency subchannels while achieving the maximum amount of power reduction. Power cutback generally prevents saturation at the receiver for short loops and limits unnecessary interference (crosstalk) to neighboring loops. During initialization the central office and customer transceivers make measurements of received signal amplitude and/or power which are used to set the automatic gain controls and to signal a power cutback level to the other transmitter. The G.992.3 standard provides for power cutback levels from 0 to 40 dB in 1 dB increments to be applied to the passband; the 6-bit variable PCB encodes the power cutback level. Because systems operating in frequencies above 1104 kHz typically use a shaped PSD, the preferred embodiment power cutback methods should take the shaping into account. In particular, to maximize the power in subchannels with a lower PSD level, the preferred embodiment power cutback methods apply a ceiling on transmit PSD. Thus the power cutback limits the peak of the transmit PSD, by defining a maximum transmit PSD level relative to the peak of the original mask. Hence, subchannels for which the PSD level is less than the peak allowed by the power cutback are unaffected.

More explicitly, the transmitter nominal (template) power level (in terms of dBm/Hz) in each subchannel is defined as the corresponding PSD mask subchannel level minus 3.5 dB (2.5 dB for the maximum fine gain setting plus 1.0 dB for implementation tolerance). FIG. 1 illustrates the preferred embodiment power cutback method applied to a nominal PSD (with a peak power level of −40 dBm/Hz) to yield the reference PSD. As shown, the nominal PSD is the 3.5 dB attenuation of the PSD mask; and the power cutback method applies a ceiling of −46 dBm/Hz. Thus the maximal power cutback of 6 dB only occurs for portions of the nominal PSD at a power level −40 dBm/Hz and no power cutback occurs for portions of the nominal PSD at a power level of −46 dBm/Hz or less. Of course, a cutback from −40 dBm/Hz to −46 dBm/Hz is a reduction by a factor of 4.

Using a generalization of G992.3 notation, the foregoing is expressed as: MAXPSD(f) is a PSD shaped according to the selected mask with the value MAXPSD representing the PSD level at the peak of the mask (which in FIG. 1 occurs in the range of subchannels 32-256 or 138-1104 kHz). The PSD level in the range of subchannels 256-512 or 1104-2208 kHz is derived from this peak level. NOMPSD(f) is a PSD shaped according to the selected mask with the value NOMPSD representing the PSD level at the peak of the mask (which in FIG. 1 occurs in the range of subchannels 32-256 or 138-1104 kHz). The PSD level in the range of subchannels 256-512 or 1104-2208 kHz is derived from this peak level. Then the reference PSD level as a function of frequency is REFPSD (f)= min{NOMPSD(f), NOMPSD−PCB} where PCB is a constant value (e.g., 6 dB in FIG. 1). The effect is that PCB imposes a ceiling on the mask. Then as in G.992.3, $tss_i$ (transmitter spectrum shaping) values represent a scaling relative to the REFPSD(f) level, and as such $tss_i$ can be interpreted as putting additional shaping on top of the already-shaped PSD mask. The available PCB levels are 0 dB to 40 dB in 1 dB increments.

3. Modifications

The preferred embodiments may be varied while retaining one or more of the feature of ceiling-based power cutback.

For example, the available cutback range of 0-40 dB and resolution of 1 dB could be varied; the available cutback levels need not be linearly (in terms of logarithms) spaced; the ceiling could be tilted to provide some rolloff with increasing frequency and so forth.

What is claimed is:

1. A method of transmit power adjustment in a multitone communication system, comprising:

adjusting transmit power by changing a power spectral density PSD for each subchannel k to a minimum of the power spectral density and a maximum of a reference power spectral density REFPSD(k)=min(NOMPSD(k), NOMPSD−PCB) where REFPSD(k) is the transmitted PSD at subchannel k, NOMPSD(k) is the maximum transmit PSD allowed at each subchannel k, NOMPSD is the maximum value of NOMPSD(k) over all k and PCB is a power cutback level.

2. The method of claim 1, wherein: said PCB is selected from the range 0 dB to 40 dB.

3. The method of claim 1, wherein:

said multitone system is an asymmetrical digital subscriber line system; and said PCB is selected as the larger of a power cutback selected by a central office transceiver and a power cutback selected by a customer transceiver.

4. A system including at least one processor, said processor configured to perform for a power spectral density where k indexes subchannels of a multitone system, for each subchannel k:

adjusting transmit power by changing a power spectral density for each subchannel k to the minimum of a power spectral density and a maximum of a reference power spectral density REFPSD(k)=min(NOMPSD(k), NOMPSD−PCB) where REFPSD(k) is the transmitted PSD at tone k, NOMPSD(k) is the maximum transmit PSD allowed at each tone k, NOMPSD is the maximum value of NOMPSD(k) over all k and PCB is a power cutback level.

5. A computer readable medium storing instructions to configure a processor to perform for a power spectral density PSD where k indexes subchannels of a multitone system, for each subchannel k:

adjusting transmit power by changing a power spectral density for each subchannel k to a minimum of the power spectral density and a maximum of a reference power spectral density REFPSD(k)=min(NOMPSD(k), NOMPSD−PCB) where REFPSD(k) is the transmitted PSD at subchannel k, NOMPSD(k) is the maximum transmit PSD allowed at each subchannel k, NOMPSD is the maximum value of NOMPSD(k) over all k and PCB is a power cutback level.

* * * * *